United States Patent
Kim et al.

(10) Patent No.: US 10,277,368 B2
(45) Date of Patent: Apr. 30, 2019

(54) METHOD FOR TRANSMITTING UPLINK FRAME IN WIRELESS LOCAL AREA NETWORK AND WIRELESS DEVICE USING THE SAME

(71) Applicant: LG ELECTRONICS INC., Seoul (KR)

(72) Inventors: Suhwook Kim, Seoul (KR); Kiseon Ryu, Seoul (KR); Jeongki Kim, Seoul (KR); Hangyu Cho, Seoul (KR); Hyunhee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/473,528

(22) Filed: Mar. 29, 2017

(65) Prior Publication Data

US 2017/0289994 A1    Oct. 5, 2017

Related U.S. Application Data

(60) Provisional application No. 62/314,939, filed on Mar. 29, 2016.

(51) Int. Cl.
*H04W 84/12* (2009.01)
*H04L 5/00* (2006.01)
(Continued)

(52) U.S. Cl.
CPC ......... *H04L 5/0007* (2013.01); *H04W 74/002* (2013.01); *H04W 74/02* (2013.01); *H04W 84/12* (2013.01)

(58) Field of Classification Search
CPC .................................................... H04W 84/12
See application file for complete search history.

(56) References Cited

U.S. PATENT DOCUMENTS

| | | | |
|---|---|---|---|
| 2016/0113034 A1* | 4/2016 | Seok | H04W 74/04 370/329 |
| 2016/0353435 A1* | 12/2016 | Ghosh | H04W 74/002 |
| 2018/0014334 A1* | 1/2018 | Ahn | H04W 28/02 |

OTHER PUBLICATIONS

IEEE LAN/MAN Standards Committee, 802.11 Working Group, "Draft Standard for Information technology—Telecommunications and information exchange between systems Local and metropolitan area networks—Specific requirements," IEEE P802.11ax/D1.0, Nov. 2016, 453 pgs., New York (US).

(Continued)

*Primary Examiner* — Kent K Krueger
(74) *Attorney, Agent, or Firm* — Lee Hong Degerman Kang Waimey

(57) ABSTRACT

According to an embodiment of the present specification, a method for transmitting an uplink frame in a wireless local area network (WLAN) system and performed by a user station (STA) includes: receiving from an access point (AP) a trigger frame comprising association identifier information for orthogonal frequency division multiple access (OFDMA)-based random access and allocation information indicating a resource unit, wherein the association identifier information indicates any one of a first value irrelevant to whether being associated with the AP, a second value for a first STA group associated with the AP, and a third value for a second STA group un-associated with the AP; and performing a countdown operation according to the association identifier information based on a backoff value which is set in a backoff counter of the user STA in order to transmit the uplink frame.

8 Claims, 17 Drawing Sheets

(51) Int. Cl.
  *H04W 74/00* (2009.01)
  *H04W 74/02* (2009.01)

(56) References Cited

OTHER PUBLICATIONS

IEEE LAN/MAN Standards Committee, 802.11 Working Group, "Draft Standard for Information technology—Telecommunications and information exchange between systems Local and metropolitan area networks—Specific requirements," IEEE P802.11-REVmc/D4.1, Jul. 2015, 3798 pgs., New York (US).

\* cited by examiner

FIG. 1
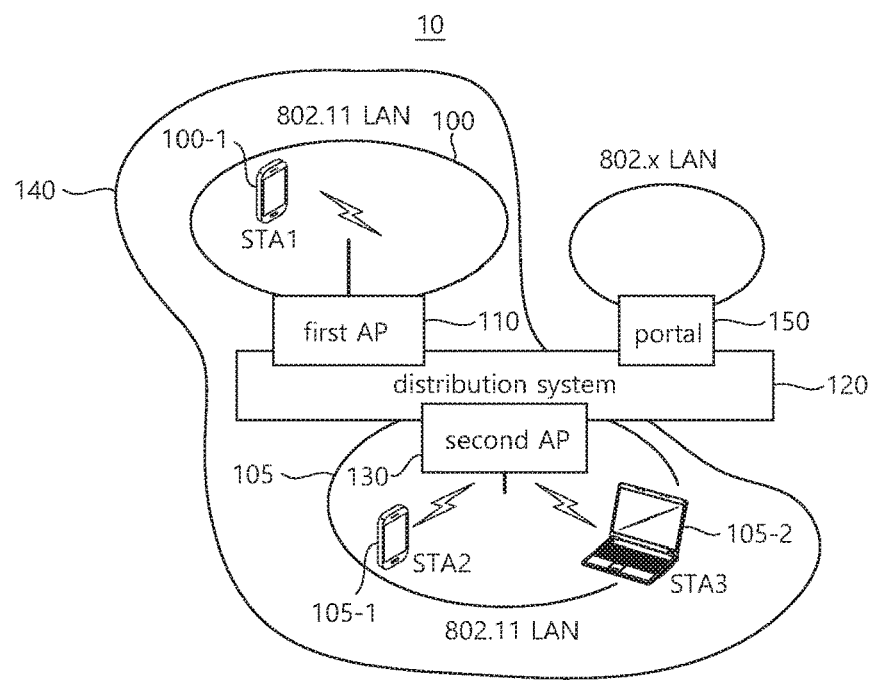
(A)
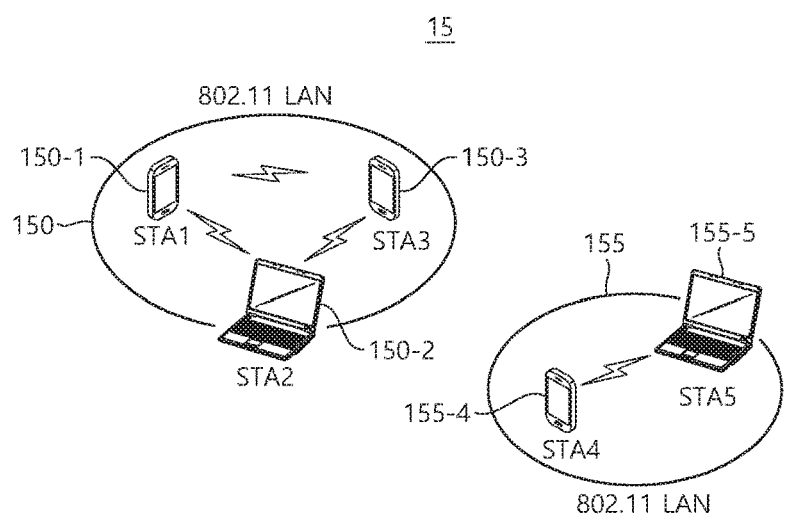
(B)

METHOD FOR TRANSMITTING UPLINK FRAME IN WIRELESS LOCAL AREA NETWORK AND WIRELESS DEVICE USING THE SAME

CROSS-REFERENCE TO RELATED APPLICATIONS

Pursuant to 35 U.S.C. § 119(e), this application claims the benefit of U.S. Provisional Application No. 62/314,939 filed on Mar. 29, 2016, the contents of which is hereby incorporated by reference herein in its entirety.

BACKGROUND

1. Technical Field

The present invention relates to wireless communication, and more particularly, to a method for transmitting an uplink frame in a wireless local area network (WLAN) system, and a wireless terminal using the same.

2. Related Art

With the advancement of information communication technologies, various wireless communication technologies have recently been developed. In particular, a wireless local area network (hereinafter, WLAN) is a technology whereby the Internet can be accessed in a wireless fashion in homes or businesses or in a region providing a specific service by using a portable terminal based on wireless frequency technologies.

For example, the portable terminal may be a personal digital assistant (PDA), a laptop, or a portable multimedia player (PMP). In general, communication between terminals of a WLAN system is performed via a management entity such as a base station or an access point (AP). The management entity is responsible for scheduling for data communication.

Various protocols for direct communication between terminals without the management entity have been proposed in order to ensure flexibility of communication between the terminals of the WLAN system. NAN is a standard established by Wi-Fi Alliance (WFA) based on the Wi-Fi standard. The NAN standard specifies synchronization and discovery procedures between devices at a frequency band of 2.5 GHz or 5 GHz.

SUMMARY

It is an object of the present invention to provide a method for transmitting an uplink frame in a wireless local area network (WLAN) system having improved capability, and a wireless terminal using the same.

The present specification relates to a method for transmitting an uplink frame in a WLAN system. According to the present embodiment, the method includes: receiving from an access point (AP) a trigger frame comprising association identifier information for orthogonal frequency division multiple access (OFDMA)-based random access and allocation information indicating a resource unit, wherein the association identifier information indicates any one of a first value irrelevant to whether being associated with the AP, a second value for a first STA group associated with the AP, and a third value for a second STA group un-associated with the AP; and performing a countdown operation according to the association identifier information based on a backoff value which is set in a backoff counter of the user STA in order to transmit the uplink frame.

BRIEF DESCRIPTION OF THE DRAWINGS

FIG. 1 is a conceptual view illustrating the structure of a wireless local area network.

DESCRIPTION OF EXEMPLARY EMBODIMENTS

Figure 2:
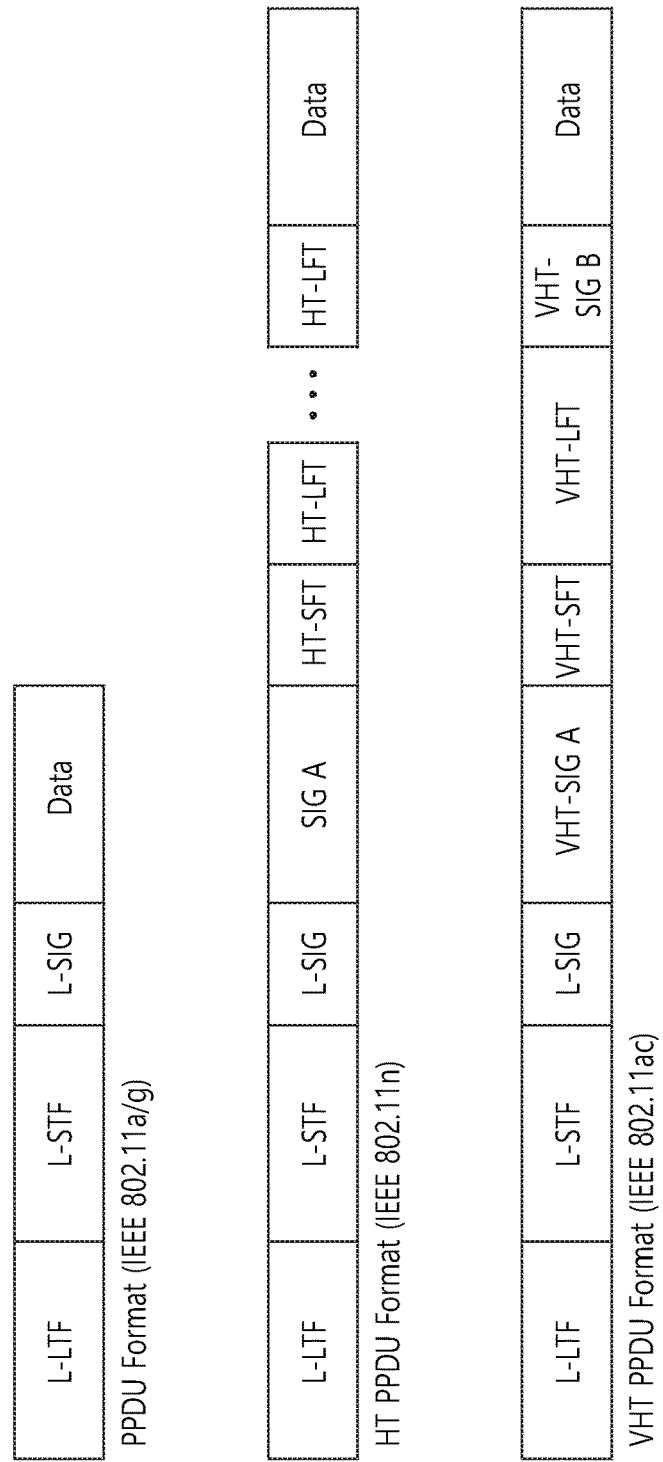
FIG. 2 is a diagram illustrating an example of a PPDU used in an IEEE standard.

The aforementioned features and following detailed descriptions are provided for exemplary purposes to facilitate explanation and understanding of the present specification. That is, the present specification are not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network (WLAN). FIG. 1 (A) illustrates the structure of an infrastructure basic service set (BSS) of institute of electrical and electronic engineers (IEEE) 802.11.

Referring the FIG. 1 (A), the wireless LAN system (10) of the FIG. 1 (A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1 (A), a network between the APs 110 and 130 and a network between the APs 110 and 130 and the STAs 100-1, 105-1, and 105-2 may be implemented.

FIG. 1 (B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1 (B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
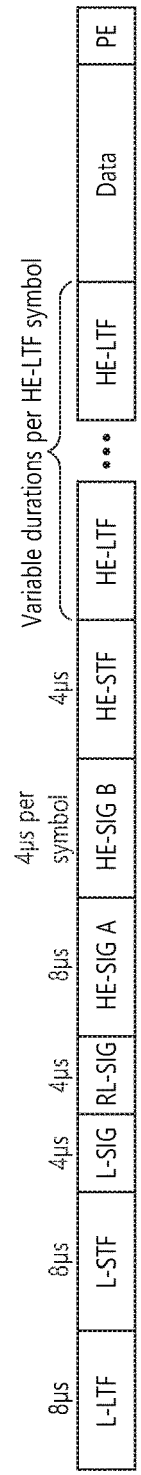
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 µs).

More detailed description of the respective fields of FIG. 3 will be made below.

Figure 4:
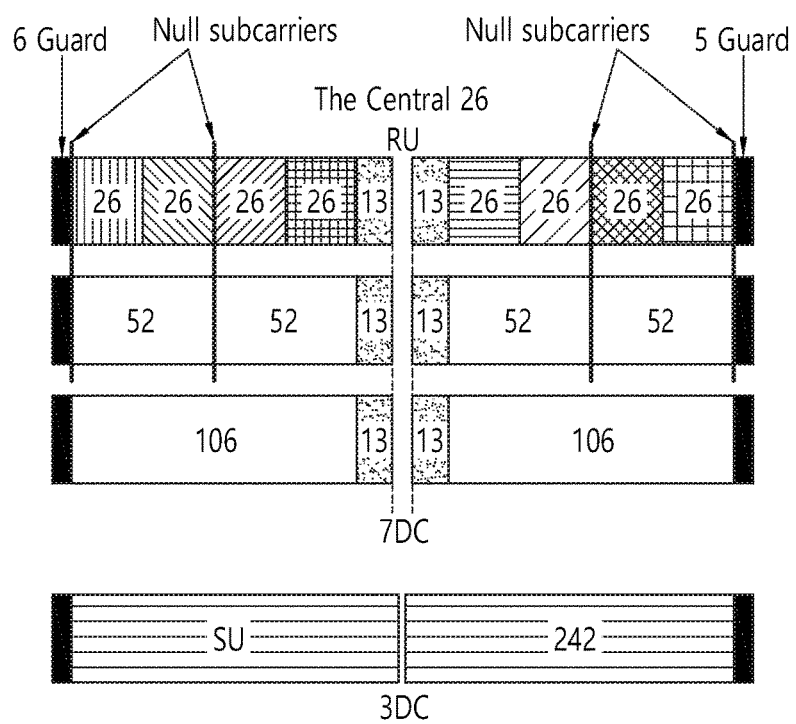
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
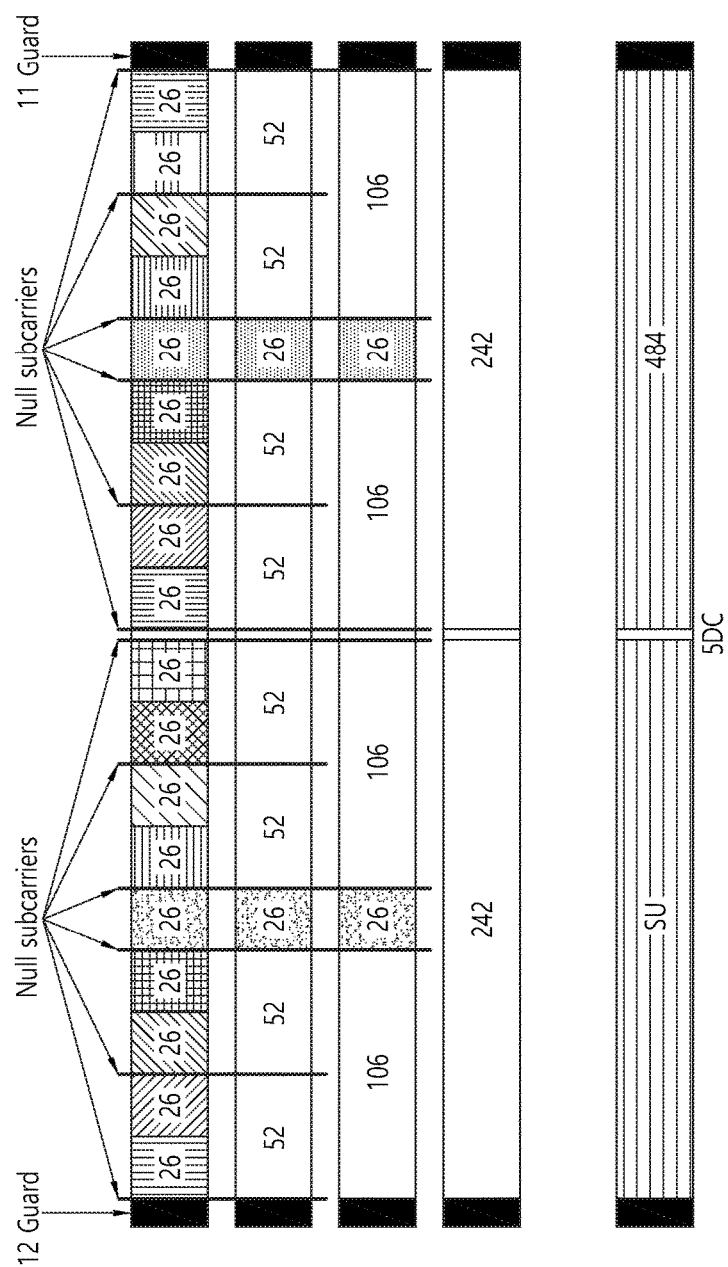
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
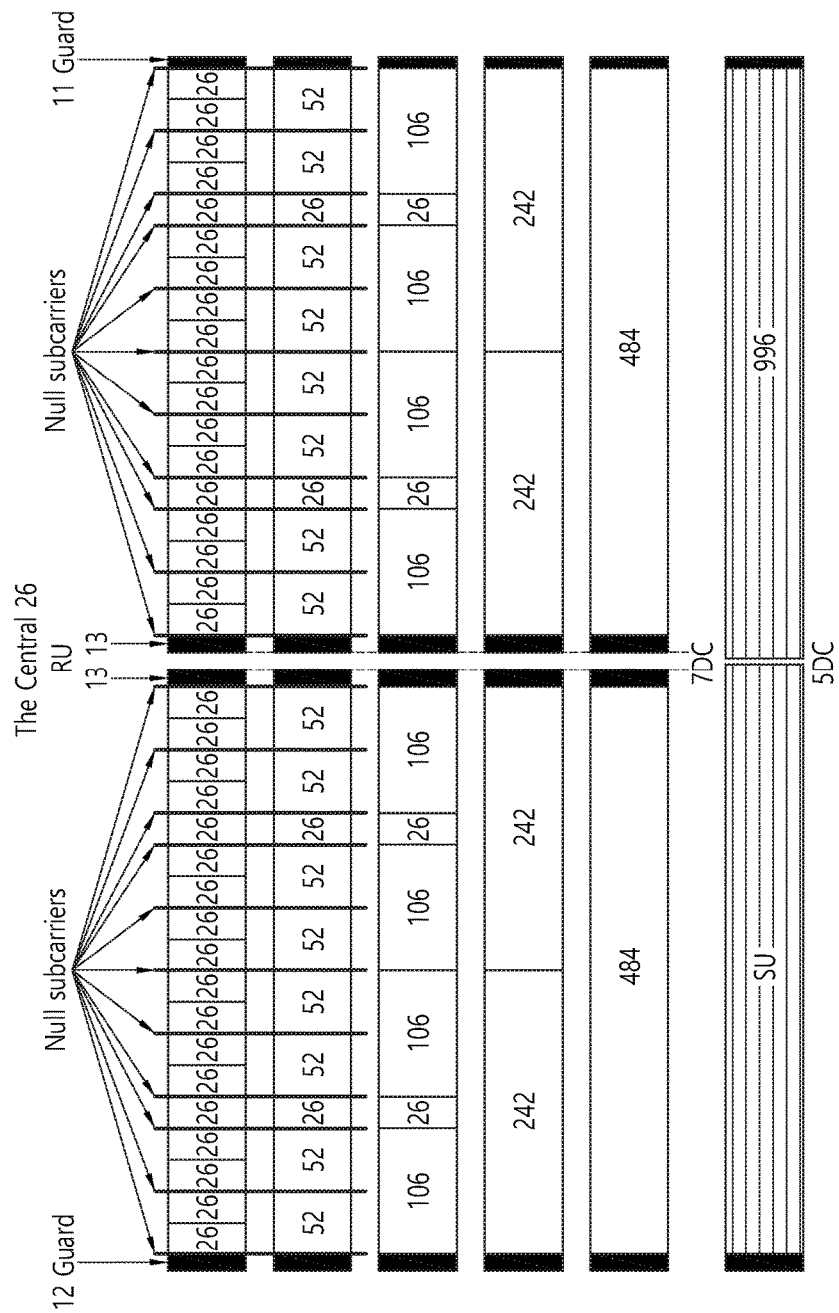
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
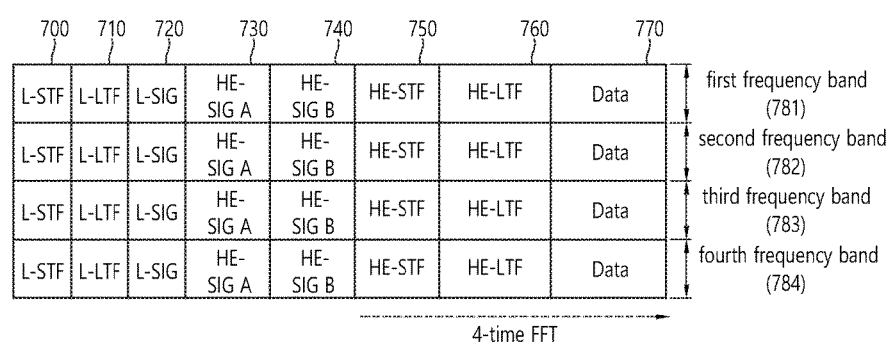
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512

FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
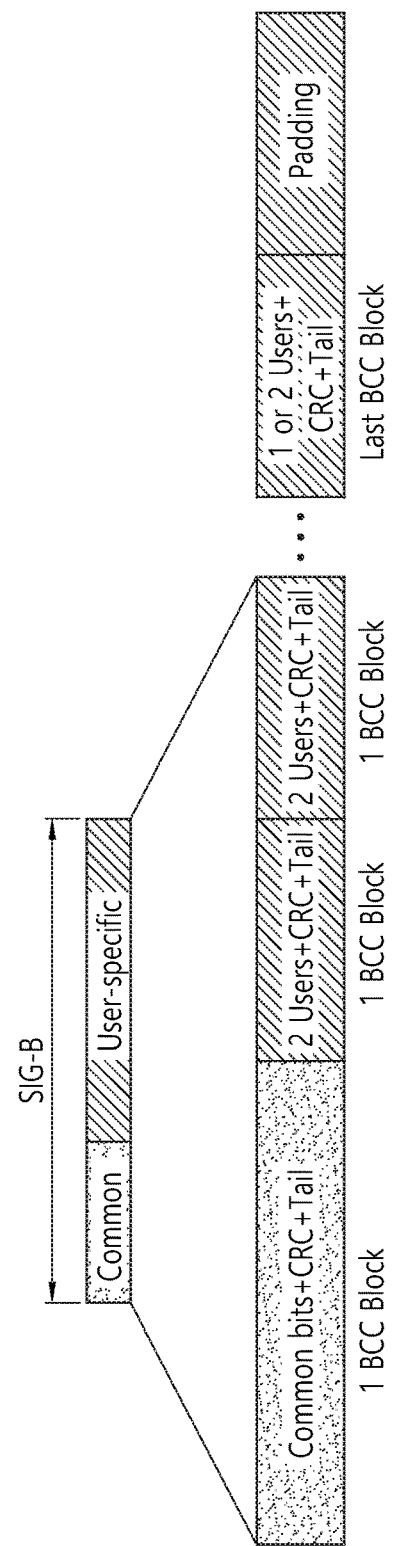
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
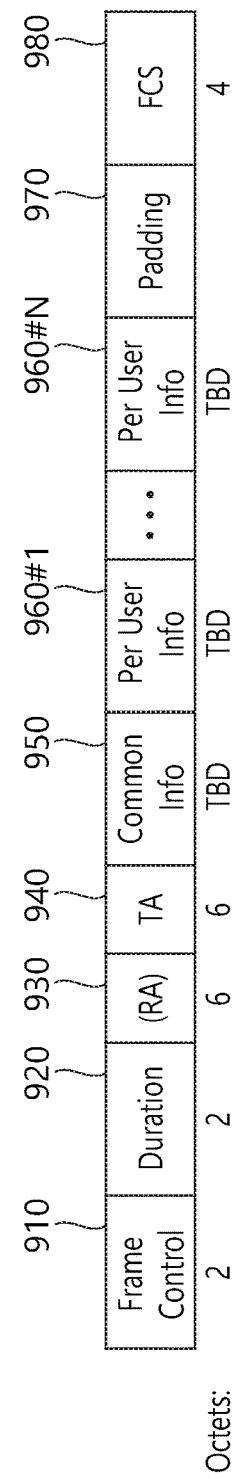
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
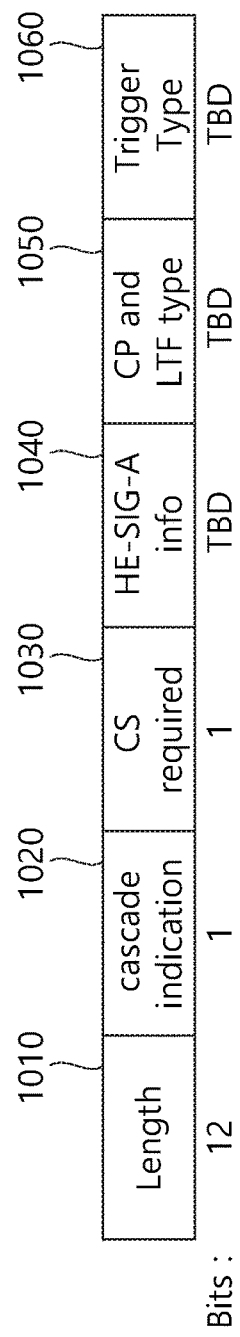
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
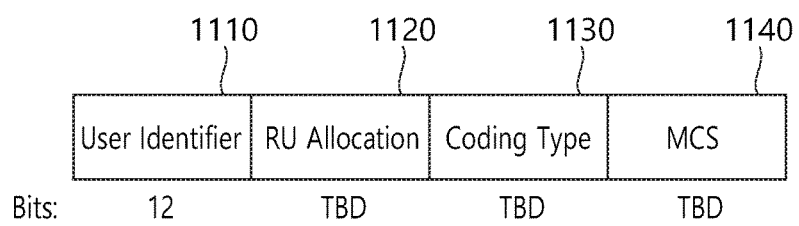
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information field corresponds, and an example of the identifier may correspond to all or part of the AID.

In the present specification, the user identifier field of FIG. 11 may be referred to as an association identifier (hereinafter, AID) field.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

Figure 12:
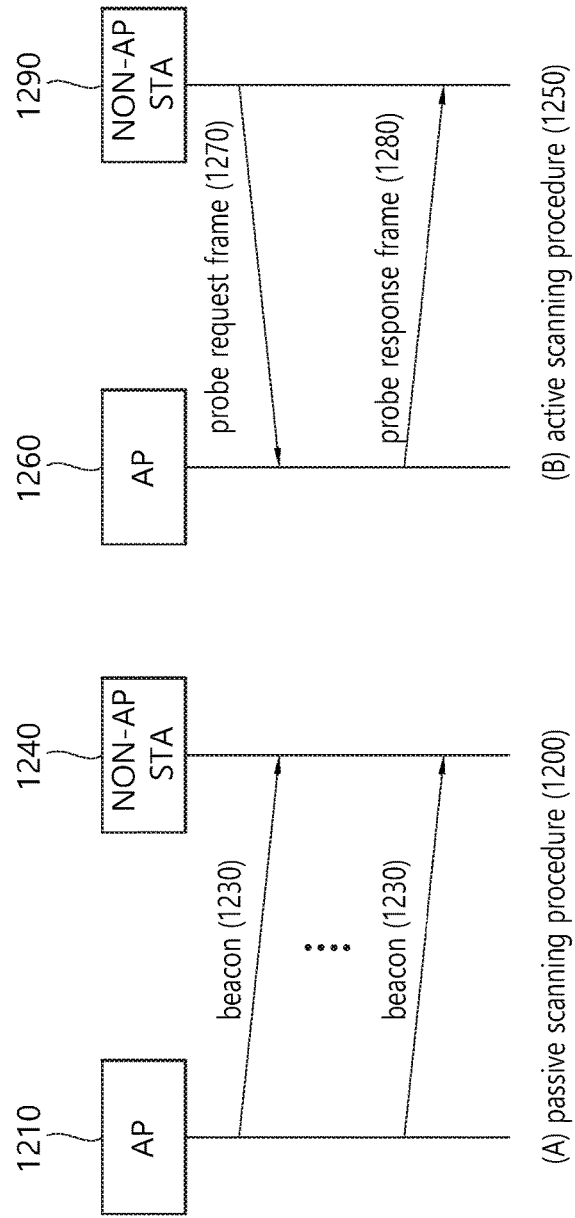
FIG. 12 is a conceptual view illustrating a scanning method in a WLAN.

FIG. 12 is a conceptual view illustrating a scanning method in a WLAN.

Referring to FIG. 12, the scanning method may be divided into passive scanning 1200 and active scanning 1250.

Referring to FIG. 12(A), the passive scanning 1200 may be performed based on a beacon frame 1230 which is periodically broadcast by an AP 1210. The AP 1210 of the WLAN may broadcast the beacon frame 1230 to a non-AP STA 1240 every specific period (e.g., 100 msec). The beacon frame 1230 may include information on a current network. The non-AP STA 1240 may periodically receive the beacon frame 1230. In order to perform an authentication/association procedure, the non-AP STA 1240 may perform scanning on the AP 1210 and a channel based on the network information included in the beacon frame 1230.

The passive scanning method 1200 is a technique whereby the non-AP STA 1240 does not first transmit a frame but receives the beacon frame 1230 transmitted from the AP 1210. Therefore, the passive scanning 1200 advantageously has a small overall overhead generated when data is transmitted/received in the network. However, since the scanning must be manually performed in proportion to a period of the beacon frame 1230, there is a disadvantage in that it takes more time to perform the scanning.

A detailed description of the beacon frame is disclosed in 8.3.3.2 beacon frame of IEEE Draft P802.11-REVmb™/D4.1, July 2015 'IEEE Standard for Information Technology Telecommunications and information exchange between systems—Local and metropolitan area networks—Specific requirements Part 11: Wireless LAN Medium Access Control (MAC) and Physical Layer (PHY) Specifications(hereinafter, IEEE 802.11)' disclosed in July 2015.

Referring to FIG. 12(B), the active scanning 1250 is a technique whereby a non-AP STA 1290 transmits a probe request frame 1270 to an AP 1260 to actively perform scanning.

The AP 1260 may receive the probe request frame 1270 from the non-AP STA 1290. The AP 1260 may wait for a random time to prevent frame collision. The AP 1260 may transmit a probe response frame 1280 including network information to the non-AP STA 1290 in response to the probe request frame 1270. The non-AP STA 1290 may obtain the network information on the basis of the received probe response frame 1280.

In case of the active scanning 1250, since the non-AP STA 1290 actively performs the scanning, there is an advantage in that it takes a short time for scanning. However, since the non-AP STA 1290 must transmit the probe request frame 1270, disadvantageously, there is an increase in a network overhead for frame transmission and reception. The probe request frame 1270 is disclosed in IEEE 802.11 8.3.3.9, and the probe response frame 1280 is disclosed in IEEE 802.11 8.3.3.10.

After the aforementioned scanning procedure is complete, the AP and the STA may perform an authentication and association procedure.

Figure 13:
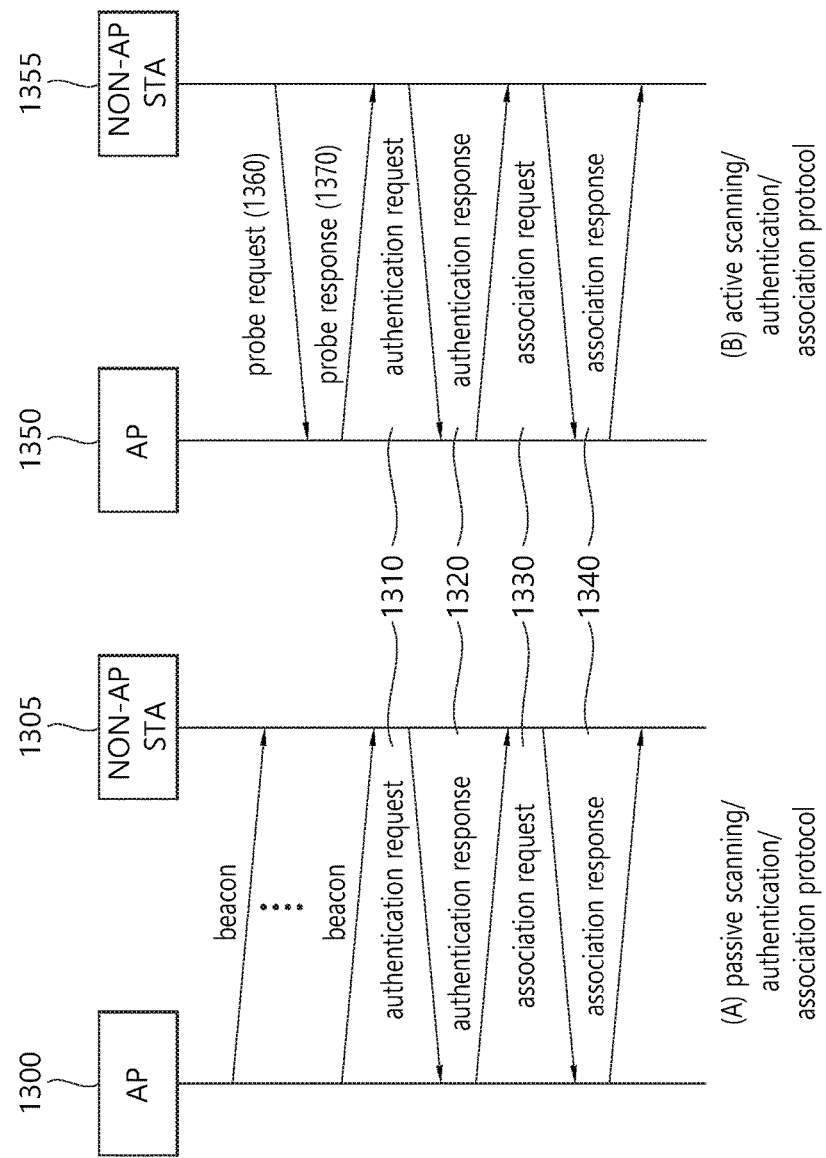
FIG. 13 is a conceptual view illustrating an authentication and association procedure after scanning of an AP and an STA.

FIG. 13 is a conceptual view illustrating an authentication and association procedure after scanning of an AP and an STA.

Referring to FIG. 12 and FIG. 13, a non-AP STA may perform the authentication and association procedure with respect to one AP among a plurality of APs which have completed a scanning procedure through passive/active scanning. For example, the authentication and association procedure may be performed through 2-way handshaking.

FIG. 13(A) is a conceptual view illustrating an authentication and association procedure after passive scanning, and FIG. 13(B) is a conceptual view illustrating an authentication and association procedure after active scanning.

The authentication and association procedure may be performed irrespectively of whether the active scanning or the passive scanning is used. For example, APs 1300 and 1350 exchange an authentication request frame 1310, an authentication response frame 1320, an association request frame 1330, and an association response frame 1340 with the non-AP STAs 1305 and 1355 to perform the authentication and association procedure.

More specifically, the authentication procedure may be performed by transmitting the authentication request frame 1310 from the non-AP STAs 1305 and 1355 to the APs 1300 and 1350. The APs 1300 and 1350 may transmit the authentication response frame 1320 to the non-AP STAs 1305 and 1355 in response to the authentication request frame 1310. An authentication frame format is disclosed in IEEE 802.11 8.3.3.11.

More specifically, the association procedure may be performed when the non-AP STAs 1305 and 1355 transmit the association request frame 1330 to the APs 1300 and 1305. The APs 1300 and 1350 may transmit the association response frame 1340 to the non-AP STAs 1305 and 1355 in response to the association request frame 1330.

The association request frame 1330 may include information on capability of the non-AP STAs 1305 and 1355. The APs 1300 and 1350 may determine whether the non-AP STAs 1305 and 1355 can be supported on the basis of the information on capability of the non-AP STAs 1305 and 1355 and included in the association request frame 1330.

For example, if the support is available, the AP 1300 and 1350 may transmit to the non-AP STAs 1305 and 1355 by allowing the association response frame 1340 to contain whether the association request frame 1330 is acceptable, its reason, and its supportable capability information. An association frame format is disclosed in IEEE Draft P802.11-REVmb™/D4.1, July 2015 8.3.3.5/8.3.3.6.

If up to the association procedure is performed, normal data transmission and reception procedures may be performed between the AP and the STA.

Figure 14:
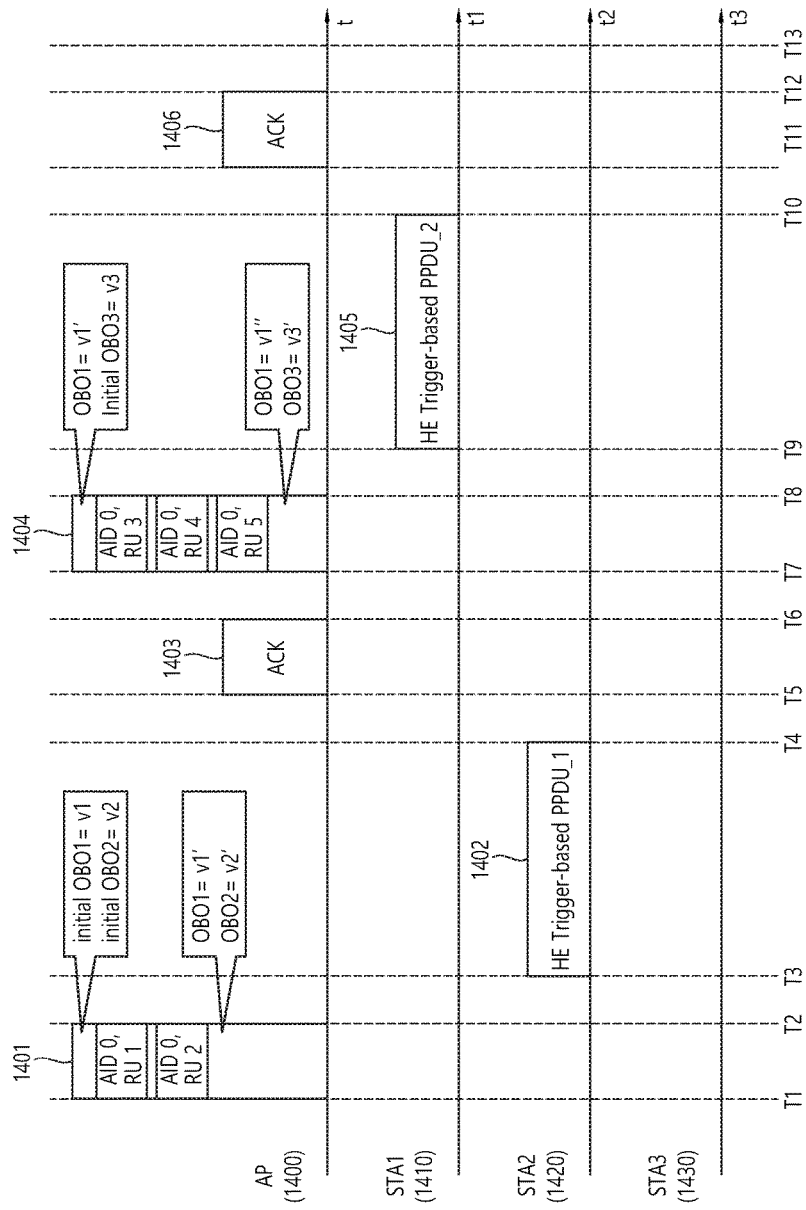
FIG. 14 illustrates an exemplary OFDMA-based random access procedure.

FIG. 14 illustrates an exemplary OFDMA-based random access procedure.

Referring to FIG. 1 to FIG. 14, a horizontal axis of an AP 1400 may represent a time t of the AP 1400. A horizontal axis of a first STA 1410 may represent a time t1 of the first STA 1410. A horizontal axis of a second STA 1420 may represent a time t2 of the second STA 1420. A horizontal axis of a third STA 1430 may represent a time t3 of the third STA 1430.

In addition, a vertical axis of the AP 1400 and the first to third STAs 1410, 1420, and 1430 may be associated with the presence of a frame. According to the present embodiment, contention window (hereinafter, CW) information associated with a value that can be set in an OFDMA backoff counter (hereinafter, OBO counter) may be signaled to a plurality of STAs through a beacon frame (not shown).

In the present specification, a trigger frame mentioned for the random access procedure may be referred to as a trigger frame for random access (hereinafter, TR). The TR has the aforementioned frame format of FIG. 9 to FIG. 11.

Referring to FIG. 14, the OBO counter may be defined for each STA. Further, an OFDMA contention window (hereinafter, OCW) in a range of an initial value (or initial OBO) that can be set in the OBO counter based on CW information may be defined.

The OCW may be set based on the CW information included in a beacon frame (not shown) transmitted by the AP 1400 prior to a first random trigger frame 1401. For example, the CW information included in the beacon frame (not shown) may include an OCWmin value for the OCW.

An STA for performing an OFDMA-based random access procedure may set the initial value (or initial OBO) of the OBO counter to a value randomly selected from an interval of [0, OCWmin] on the basis of the received CW information.

For example, when the beacon frame (not shown) is received from the AP 1400, the first to third STAs 1410, 1420 and 1430 may individually set the initial value (initial OBO) of the OBO counter of each STA on the basis of the CW information included in the beacon frame (not shown) in order to perform the OFDMA-based random access procedure.

For example, it is assumed that a value included in the CW information included in the beacon frame (not shown) transmitted prior to the first random trigger frame 1401 is '7'.

The first STA 1410 may set an integer value v1 randomly selected from [0, CWmin] to a first initial value (initial OBO1) in a first OBO counter. For example, the first STA 1410 may set '3' selected from [0, 7] to the first initial value (initial OBO1) in the first OBO counter.

The second STA 1420 may set an integer value v2 randomly selected from [0, CWmin] to a second initial value (initial OBO2) in a second OBO counter. For example, the second STA 1420 may set '1' selected from [0, 7] to the second initial value (initial OBO2) in the second OBO counter.

The third STA 1430 may set an integer value v3 randomly selected from [0, CWmin] to a third initial value (initial OBO3) in a third OBO counter. For example, the third STA 1430 may set '4' selected from [0, 7] to the third initial value (initial OBO3) in the third OBO counter.

In a first duration T1-T2 of FIG. 14, the AP 1400 may transmit the first random trigger frame 1401. Further, it is assumed that an STA which intends to perform the random access procedure in a first cycle T1-T7 is the first and second STAs 1310 and 1320.

The first random trigger frame 1401 may include allocation information indicating a plurality of resource units (RUs) allocated by the AP 1400. For example, the allocation information may indicate two RUs (i.e., RU1 and RU2).

A first user identifier field of a first user-specific field (e.g., 960#1 in FIG. 9) of the first random trigger frame 1401 may all be set to '0'. Further, a first RU allocation field of the first user-specific field may be set to indicate the first RU (i.e., RU1). A second user identifier field of a second user-specific field (e.g., 960#2 in FIG. 9) of the first random trigger frame 1401 may all be set to '0'. Further, a second RU allocation field of the second user-specific field may be set to indicate the second RU (i.e., RU2).

Each STA which has received the random trigger frame may determine an RU indicated in an RU allocation field corresponding to a user identifier field set to '0' as an RU used for the OFDMA-based random access procedure.

The first STA 1410 may perform a first countdown operation. The first STA 1410 may decrease the first initial value v1 set in the first OBO counter by the number '2' of the first and second resource units (i.e., RU1 and the RU2). Accordingly, an updated first count value v1' in the first OBO count is '1'.

The second STA 1420 may perform a second countdown operation. The second STA 1420 may update a value v2' of a second OBO counter to '0' by decreasing the second initial value v2 set in the second OBO counter. Accordingly, the second countdown operation may be complete.

The second STA 1420 which has completed the second countdown operation may select one of the RU sets (i.e., RU1 and RU2) allocated to the first random trigger frame 1401 as a random RU. For example, the second STA 1420 may select the RU2 as a random RU for transmission of a first uplink frame.

A second duration T2-T3 may be a short inter-frame space (SIFS).

In a third duration T3-T4, the second STA 1420 may use the random RU to transmit to the AP 1400 a first trigger-based frame (HE Trigger-based PPDU_1) 1402 corresponding to the first random trigger frame 1401.

A fourth duration T4-T5 may be an SIFS.

As shown in a fifth duration T5-T6, the second STA 1420 according to one embodiment of the present specification may receive an ACK frame 1403 in response to the first trigger based frame 1402.

In a sixth duration T6-T7, the AP 1400 and the first to third STAs 1410, 1420 and 1430 may wait.

In a seventh duration T7-T8, the AP 1400 of FIG. 14 may transmit a second random trigger frame 1404. Further, it is assumed that an STA which intends to perform the random access procedure in a second cycle T7-T13 is the first and third STAs 1410 and 1430.

For example, for the OFDMA-based random access procedure, the second random trigger frame 1404 may include allocation information indicating a plurality of RUs allocated by the AP 1400. For example, the allocation information may indicate three RUs (i.e., RU3, RU4, and RU5).

A first user identifier field of a first user-specific field (e.g., 960#1 in FIG. 9) of the second random trigger frame 1404 may all be set to '0'. Further, a first RU allocation field of the first user-specific field may be set to indicate a third RU (i.e., RU3). A second user identifier field of a second user-specific field (e.g., 960#2 in FIG. 9) of the second random trigger frame 1404 may all be set to '0'. Further, a second RU allocation field of the second user-specific field may be set to indicate a fourth RU (i.e., RU4).

A third user identifier field of a third user-specific field (e.g., 960#3 in FIG. 9) of the second random trigger frame 1404 may all be set to '0'. Further, a third RU allocation field of the third user-specific field may be set to indicate a fifth RU (i.e., RU5).

In a seventh duration T7-T8, the first STA 1410 may resume the first countdown operation. The first STA 1410 may update a value v1" of the first OBO counter to '0' by decreasing the first initial value v1' held in the first OBO counter. Accordingly, the first countdown operation may be complete.

The first STA 1410 which has completed the first countdown operation may select one of the RU sets (i.e., RU3, RU4, and RU5) allocated to the second random trigger frame 1404 as a random RU. For example, the first STA 1410 may select the RU3 as a random RU for transmission of a second uplink frame.

The third STA 1430 may start a third countdown operation. The third STA 1430 may sequentially decrease a third initial value (initial OBO3) set in the third OBO counter by the number '3' of third to fifth resource units (i.e., RU3 to RU5). Accordingly, the third count value v3' held in the third OBO count is '2'.

An eighth duration T8-T9 may be an SIFS.

In a ninth duration T9-T10, The first STA 1410 may use the random RU to transmit to the AP 1400 a second trigger-based frame (HE Trigger-based PPDU_2) 1405 corresponding to the second random trigger frame 1404.

A tenth duration T10-T11 may be an SIFS.

As shown in an eleventh duration T11-T12, the first STA 1410 according to one embodiment of the present specification may receive an ACK frame 1406 in response to the second trigger based frame 1405.

In a twelfth duration T12-T13, the AP 1400 and the first to third STAs 1410, 1420 and 1430 may wait.

If an STA which has completed the random access procedure fails to receive the ACK frame corresponding to the uplink frame transmitted through the random RU, the STA which has failed to receive the ACK frame may exponentially increase a range of an OCW for uplink transmission in order to decrease a possibility of collision between STAs. That is, the exponentially increasing of the range of the OCW means that a counter window (CW) of the OBO counter is increased to [0, 2*OCW+1]. Subsequently, the STA may set a value randomly selected from the increased CW duration as an initial value for the OBO counter.

Figure 15:
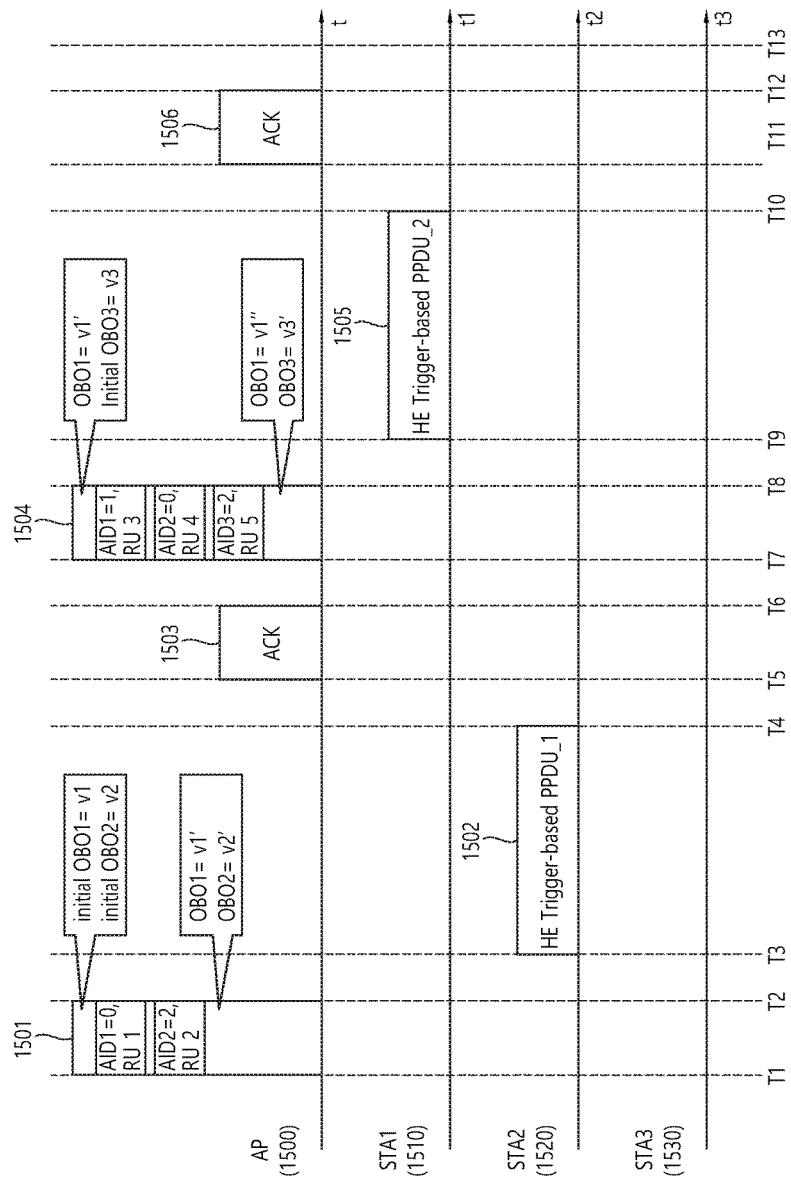
FIG. 15 illustrates an exemplary OFDMA-based random access procedure according to the present embodiment.

FIG. 15 illustrates an exemplary OFDMA-based random access procedure according to the present embodiment.

Referring to FIG. 1 to FIG. 15, it will be understood that the content of the time axes t1, t2, and t3 and time durations T1 to T13 of the AP 1500 and first to third STAs 1510, 1520 and 1530 of FIG. 15 can be replaced by the content described above in FIG. 14.

The OBO counter of each STA according to the present embodiment may be counted down in unit of RU according to association identifier information. Referring to FIG. 15, according to the present embodiment, the AID field of FIG. 11 (i.e., 1110 in FIG. 11) of the random trigger frame may be modified.

Upon receiving a trigger frame in which the user identifier field 1110 of FIG. 11 is indicated as '0', the conventional STA may determine the received trigger frame as a random trigger frame. The conventional STA cannot determine whether the received random trigger frame is for an STA associated with an AP or for an STA un-associated therewith.

On the contrary, the random trigger frame according to the present embodiment may additionally use some bits among 12 bits allocated to the AID field 1110 of FIG. 11.

The AP according to the present embodiment may set the AID field of FIGS. 11 to '0', '1', or '2' to indicate whether it is a random trigger frame for the STA associated with the AP.

For example, for the STA associated with the AP or the STA unassociated therewith, the AP may set an AID field of a user-specific field (Per User Info) to '0'. Accordingly, the STA may receive a trigger frame in which the AID field of FIG. 11 included in the user-specific field (Per User Info) of FIG. 9 is set to '0'.

That is, the associated STA or un-associated STA according to the present embodiment may determine an RU indicated by an RU allocation field 1120 corresponding to the AID field set to '0' as an RU allocated for a random access procedure, irrespective of whether being associated with the AP.

However, it is to be understood that the '0' set in the AID field for indicating the STA regardless of whether it is associated with the AP is merely an example, and the present specification is not limited thereto.

As another example, for the STA associated with the AP, the AP may set the AID field of the user-specific field (Per User Info) to '1'. Accordingly, the STA may receive a trigger frame in which the AID field of FIG. 11 included in the user-specific field of FIG. 9 is set to '1'.

That is, the associated STA according to the present embodiment may determine only an RU indicated by the RU allocation field 1120 corresponding to the AID field set to '1' as the RU allocated for the random access procedure.

However, it is to be understood that the '1' set in the association identifier (AID) field to indicate the STA associated with the AP is only an example, and the present specification is not limited thereto.

As another example, for the STA un-associated with the AP, the AP may set the AID field of the user-specific field (Per User Info) to '2'. Accordingly, the STA may receive a trigger frame in which the AID field of FIG. 11 included in the user-specific field of FIG. 9 is set to '2'.

That is, according to the present embodiment, the un-associated STA may determine only an RU indicated by the RU allocation field 1120 corresponding to the AID field set to '2' as the RU allocated for the random access procedure.

However, it is to be understood that the '2' set in the association identifier (AID) field to indicate the STA unassociated with the AP is only an example, and the present specification is not limited thereto.

For example, the maximum value of the association identifier field that can be indicated through the HE-SIG-B field consisting of 11 bits of the current HE MU PPDU may be 2047, which is $2^{11}-1$. Of these, '2047' is used as a broadcast address, and '2046' can be used to indicate a resource unit (RU) to which a PPDU is not allocated.

Accordingly, the value of the association identifier (AID) field to indicate a non-associated STA may be set to '2045'. Also, since the AID field for uplink transmission is allocated to 12 bits, '2045' may be appropriate as the value of the AID field for indicating a non-associated STA.

According to the present embodiment, when a beacon frame (not shown) is received from an AP 1500, first to third STAs 1510, 1520 and 1530 for performing an OFDMA based random access procedure may individually set an initial value (initial OBO) of an OBO counter of each STA on the basis of CW information included in a beacon frame (not shown).

For brief and clear explanation of FIG. 15, as already assumed in FIG. 14, it is assumed that a value (CWmin) included in the CW information included in the beacon frame (not shown) transmitted prior to a first random access frame 1501 is '7'.

Further, it is assumed that an STA which intends to perform the random access procedure in the first cycle T1-T7 is the first and second STAs 1510 and 1520. It is assumed that an STA which intends to perform the random access procedure in the second cycle T7-T13 is the first and third STAs 1410 and 1430.

It is assumed that the first STA 1510 of FIG. 15 is an associated STA which has performed the association procedure described above in FIG. 13. It is assumed that the second and third STAs 1520 and 1530 are un-associated STAs which have not performed the association procedure described above in FIG. 13.

In the present specification, a set of at least one STA associated with the AP is referred to as a first STA group. In the present specification, a set of at least one STA un-associated with the AP is referred to as a second STA group.

Accordingly, in the present specification, it will be understood that the first STA 1510 belongs to the first STA group, and the second and third STAs 1520 and 1530 belong to the second STA group.

As described above in FIG. 14, the first STA 1510 may set an integer value v1 randomly selected from [0, CWmin] to a first initial value (initial OBO1) in a first OBO counter. For example, the first STA 1510 may set '3' selected from [0, 7] to the first initial value (initial OBO1) in the first OBO counter.

The second STA 1520 may set an integer value v2 randomly selected from [0, CWmin] to a second initial value (initial OBO2) in a second OBO counter. For example, the second STA 1520 may set '2' selected from [0, 7] to the second initial value (initial OBO2) in the second OBO counter.

The third STA 1530 may set an integer value v3 randomly selected from [0, CWmin] to a third initial value (initial OBO3) in a third OBO counter. For example, the third STA 1530 may set '4' selected from [0, 7] to the third initial value (initial OBO3) in the third OBO counter.

In a first duration T1-T2, the AP 1500 according to the present embodiment may transmit the first random trigger frame 1501. The first random trigger frame 1501 according to the present embodiment may include allocation information indicating a plurality of RUs allocated by the AP 1500. For example, the allocation information may indicate two resource units (i.e., RU1 and RU2).

A first association identifier (AID1) field (i.e., 1110 in FIG. 11) included in a first user-specific field (e.g., 960#1 in FIG. 9) of the first random trigger frame 1501 may all be set to '0'. A first RU allocation field (i.e., 1120 in FIG. 11) included in the first user-specific field of the first random trigger frame 1501 may be set to indicate the RU1.

A second association identifier (AID2) field (i.e., 1110 in FIG. 11) included in a second user-specific field (e.g., 960#2 in FIG. 9) of the first random trigger frame 1501 may all be set to '2'. A second RU allocation field (i.e., 1120 in FIG. 11) of the second user-specific field may be set to indicate the RU2.

The first STA 1510 according to the present embodiment may perform a first countdown operation on the basis of a first initial value (initial OBO1) preset in a first OBO counter. More specifically, since the first STA 1510 of FIG. 15 is an STA associated with the AP 1500, the first STA 1510 may determine only the RU1 corresponding to the AID1 field of the first random trigger frame 1501 as an RU allocated for the random access procedure.

Accordingly, the first STA 1510 may decrease the first initial value v1 set in the first OBO counter by the number '1' of the first resource units (i.e., RU1). Accordingly, an updated first count value v1' in the first OBO count is '2'.

Likewise, the second STA 1520 according to the present embodiment may perform a second countdown operation on the basis of a second initial value (initial OBO2) preset in a second OBO counter. More specifically, since the second STA 1520 of FIG. 15 is an STA un-associated with the AP 1500, the second STA 1520 may determine the RU1 corresponding to the AID1 field and the RU2 corresponding to the AID2 field as the RU allocated for the random access procedure.

Accordingly, the second STA 1520 may decrease the second initial value v2 set in the second OBO counter by the number '1' of the second resource units (i.e., RU2). Accordingly, an updated second count value v2' in the second OBO count is '0'.

The second STA 1520 which has completed the second countdown operation may select one of the RU1 and RU2 allocated for the un-associated STA to the first random trigger frame 1501 as a random RU. For example, the second STA 1520 may select the RU2 as a random RU for transmission of a first uplink frame.

A second duration T2-T3 may be a short inter-frame space (SIFS).

In a third duration T3-T4, the second STA 1520 may use the random RU to transmit to the AP 1500 a first trigger-based frame (HE Trigger-based PPDU_1) 1502 corresponding to the first random trigger frame 1501.

A fourth duration T4-T5 may be an SIFS.

In a fifth duration T5-T6, the second STA 1520 according to one embodiment of the present specification may receive an ACK frame 1503 in response to the first trigger based frame 1502.

In a sixth duration T6-T7, the AP 1500 and the first to third STAs 1510, 1520 and 1530 may wait.

In a seventh duration T7-T8, the AP 1500 according to the present embodiment may transmit a second random trigger frame 1504. The second random trigger frame 1504 according to the present embodiment may include allocation information indicating a plurality of RUs allocated by the AP 1500. For example, the allocation information may indicate three resource units (i.e., RU3, RU4, and RU5).

A first association identifier (AID1) field (i.e., 1110 in FIG. 11) included in a first user-specific field (e.g., 960#1 in FIG. 9) of the second random trigger frame 1504 may all be set to '1'. A first RU allocation field (i.e., 1120 in FIG. 11) included in the first user-specific field of the second random trigger frame 1504 may be set to indicate the RU3.

A second association identifier (AID2) field included in a second user-specific field of the second random trigger frame 1504 may all be set to '0'. A second RU allocation field of the second user-specific field may be set to indicate the RU4.

A third association identifier (AID3) field included in a third user-specific field of the second random trigger frame 1504 may be set to '2'. A third RU allocation field of the third user-specific field may be set to indicate the RU5.

In a seventh duration T7-T8, the first STA 1510 may resume the first countdown operation.

More specifically, since the first STA 1510 is an STA associated with the AP 1500, the first STA 1510 may determine the RU1 corresponding to the AID1 field of the second random trigger frame 1502 and the RU2 corresponding to the AID2 field as an RU allocated for a random access procedure.

Accordingly, the first STA 1510 may update a value v1" of the first OBO counter to '0' by decreasing the first initial value v1' held in the first OBO counter. Accordingly, the first countdown operation may be complete.

The first STA 1510 which has completed the first countdown operation may select one of the RU sets (i.e., RU3 and RU4) allocated for the associated STA to the second random trigger frame 1504 as a random RU. For example, the first STA 1510 may select the RU3 as a random RU for transmission of a second uplink frame.

The third STA 1530 may perform a third countdown operation on the basis of a third initial value (initial OBO3) preset in a third OBO counter. More specifically, since the third STA 1530 of FIG. 15 is an STA un-associated with the AP 1500, the third STA 1530 may determine the RU4 corresponding to the AID2 field and the RU5 corresponding to a third association identifier (AID3) field as the RU allocated for the random access procedure.

Accordingly, the third STA 1530 may decrease the third initial value v3 set in the third OBO counter by the number '2' of fourth and fifth resource units (i.e., RU4 and RU5). Accordingly, an updated third count value v3' in the third OBO count is '2'.

The eighth section (T8 to T9) may be SIFS.

The first STA 1510 may use the random RU to transmit to the AP 1500 a second trigger-based frame (HE Trigger-based PPDU_2) 1505 corresponding to the second random trigger frame 1504.

A tenth duration T10-T11 may be an SIFS.

In an eleventh duration T11-T12, the first STA 1510 according to one embodiment of the present specification may receive an ACK frame 1506 in response to the second trigger based frame 1505.

In a twelfth duration T12-T13, the AP 1500 and the first to third STAs 1510, 1520 and 1530 may wait.

In general, a length of a frame exchanged by the STA un-associated with the AP is relatively longer than a length of a frame exchanged by the STA associated with the AP.

For example, the frame exchanged by the STA un-associated with the AP may be the probe request frame or probe response frame of FIG. 12. Further, the frame exchanged by the STA un-associated with the AP may include a frame related to the authentication and association procedure of FIG. 13.

For example, the frame exchanged by the STA associated with the AP may include a data frame, a frame related to feedback information, a buffer status report frame (hereinafter, a BSR frame), or an uplink resource allocation request frame.

A detailed description on each frame mentioned as an example is disclosed in IEEE Draft P802.11-REVmb™/ D4.1, July 2015 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' disclosed in July 2015 and 802.11ax™/D1.0, November 2016.

The AP may determine a size of an RU for an unspecified STA for performing a random access procedure with respect to a BSR frame having a relatively short length. In this case, the AP must additionally perform a fragmentation operation to transmit frames having a relatively long length to the determined RU.

On the contrary, the AP may determine a size of an RU for an unspecified STA for performing a random access procedure with respect to a frame having a relatively long length. In this case, the AP must additionally perform a padding operation to transmit frames having a relatively short length to the determined RU. The aforementioned fragmentation operation or padding operation may deteriorate capability of a WLAN system.

That is, the WLAN system according to the present embodiment may use a bit allocated for the random access procedure by extending the bit in AID information of the existing trigger frame, and thus may allocate an RU of a relatively small size to an associated STA, and may allocate an RU having a relatively large size to an un-associated STA. Therefore, according to the present embodiment, the WLAN system having improved capability may be provided.

Although not shown in FIG. 15, according to another embodiment of the present specification, the AP may set the AID field of FIG. 11 to '0' or '1' to indicate whether it is a random trigger frame for an STA associated with the AP.

For example, for the STA associated with the AP or the STA unassociated therewith, the AP may set an AID field of a user-specific field (Per User Info) to '0'. Accordingly, the STA may receive a trigger frame in which the AID field of FIG. 11 included in the user-specific field (Per User Info) of FIG. 9 is set to '0'.

That is, the associated STA or un-associated STA according to the present embodiment may determine an RU indicated by an RU allocation field 1120 corresponding to the AID field set to '0' as an RU allocated for a random access procedure, irrespective of whether being associated with the AP.

As another example, for the STA un-associated with the AP, the AP may set the AID field of the user-specific field (Per User Info) to '1'. Accordingly, the STA may receive a trigger frame in which the AID field of FIG. 11 included in the user-specific field of FIG. 9 is set to '1'.

That is, the un-associated STA according to the present embodiment may determine only an RU indicated by the RU allocation field 1120 corresponding to the AID field set to '1' as the RU allocated for the random access procedure.

In addition, although not shown in FIG. 15, according to another embodiment of the present specification, the AP may set the AID field of FIG. 11 to '0' to '4' to indicate whether it is a random trigger frame for an STA associated with the AP.

For example, for the STA associated with the AP or the STA unassociated therewith, the AP may set the AID field of the user-specific field (Per User Info) to '0'.

For an STA for transmitting a buffer status report (BSR) frame among STAs associated with the AP, the AP may set the AID field of the user-specific field (Per User Info) to '1'.

For an STA for transmitting another frame other than the BSR frame among STAs associated with the AP, the AP may set the AID field of the user-specific field (Per User Info) to '2'.

For an STA for transmitting the aforementioned association request frame of FIG. 13 among STAs un-associated with the AP, the AP may set the AID field of the user-specific field (Per User Info) to '3'.

For an STA for transmitting another frame other than the aforementioned association request frame of FIG. 13 among STAs un-associated with the AP, the AP may set the AID field of the user-specific field (Per User Info) to '4'.

When the AID field is extended as described above, the AP can effectively determine a size of an RU. Therefore, the AP can smoothly satisfy QoS requirements or initial connection conditions for each traffic.

Figure 16:
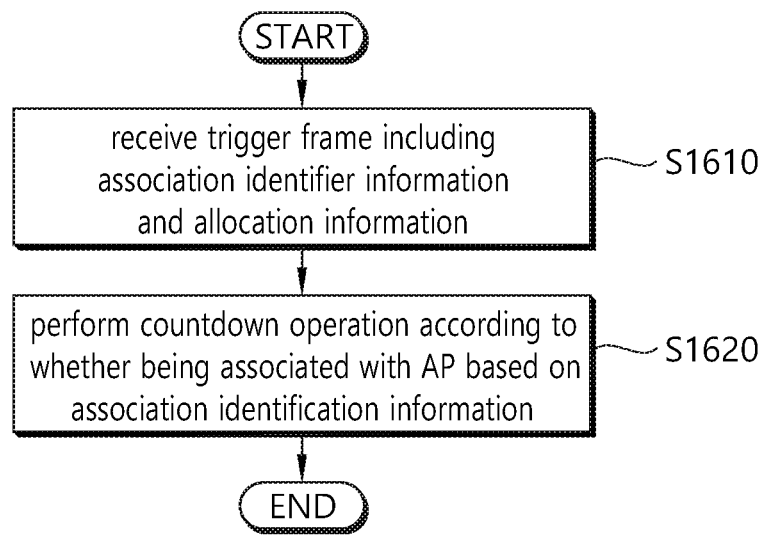
FIG. 16 is a flowchart illustrating an exemplary OFDMA-based random access procedure according to the present embodiment.

FIG. 16 is a flowchart illustrating an exemplary OFDMA-based random access procedure according to the present embodiment.

Referring to FIG. 15 and FIG. 16, in step S1610, an STA may receive from an AP a trigger frame including association identifier information for OFDMA-based random access and allocation information indicating an RU.

For example, the association identifier information may indicate any one of a first value (e.g., set to '0') irrelevant to whether being associated with the AP, a second value (e.g., set to '1') for a first STA group associated with the AP, and a third value (e.g., set to '2') for a second STA group un-associated with the AP.

In step S1620, the STA according to the present embodiment may perform a countdown operation based on whether being associated with the AP on the basis of the received association identifier information.

More specifically, in order to transmit an uplink frame, the STA may perform the countdown operation according to the association identifier information based on a backoff value which is set in an OBO counter of a user STA.

For example, if the association identifier information included in the trigger frame indicates the second value for the first STA associated with the AP and if the STA for performing the countdown operation is the STA associated with the AP, the STA may determine an RU corresponding to the association identifier information as an RU for random access.

On the contrary, if the association identifier information included in the trigger frame indicates the third value for the second STA un-associated with the AP and if the STA for performing the countdown operation is the STA associated with the AP, the STA may not determine the RU corresponding to the association identifier information as the RU for random access.

It will be understood that the aforementioned description is also equally applied to a case (e.g., FIG. 15) of receiving a trigger frame including association identifier information for a plurality of association identifiers and allocation information indicating a plurality of RUs.

For the STA associated with the AP and the STA un-associated therewith, the AP may set an AID field of a user-specific field (Per User Info) to '0'.

For example, irrespective of whether being associated with the AP, the AP may set the AID field to '0' to request an unspecified STA to transmit a frame in various manners. Further, if it is determined that there are not many STAs currently associated with the AP and that there are many un-associated STAs around the AP, the AP may set the AID field to '0'. Further, if a size of an RU for the unspecified STA is large, the AP may set the AID field to '0'.

As another example, for the STA associated with the AP, the AP may set the AID field of the user-specific field (Per User Info) to '1'.

For example, the AP may set the AID field to '1' to request the unspecified STA associated with the AP to transmit a frame. Further, if it is determined that there are many STAs currently associated with the AP, the AP may set the AID field to '1'. Further, if the size of the RU for the unspecified STA is small, the AP may set the AID field to '1'.

As another example, for the STA un-associated with the AP, the AP may set the AID field of the user-specific field (Per User Info) to '2'.

For example, the AP may set the AID field to '2' to request the unspecified STA un-associated with the AP to transmit a frame. Further, if it is determined that there are not many STAs currently associated with the AP and that there are many un-associated STAs around the AP, the AP may set the AID field to '2'. Further, if the size of the RU for the unspecified STA is large, the AP may set the AID field to '2'. Further, if a traffic load of the associated STA is low, the AP may set the AID field to '2'.

Figure 17:
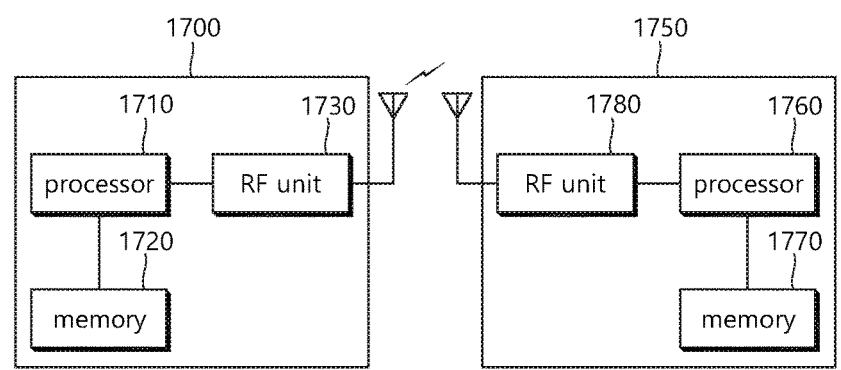
FIG. 17 is a block view illustrating a wireless device to which an exemplary embodiment of the present invention can be applied.

FIG. 17 is a block view illustrating a wireless device to which the exemplary embodiment of the present invention can be applied.

Referring to FIG. 17, as an STA that can implement the above-described exemplary embodiment, the wireless device may correspond to an AP or a non-AP station (STA). The wireless device may correspond to the above-described user or may correspond to a transmitting device transmitting a signal to the user.

The AP 1700 includes a processor 1710, a memory 1720, and a radio frequency (RF) unit 1730.

The RF unit 1730 is connected to the processor 1610, thereby being capable of transmitting and/or receiving radio signals.

The processor 1710 implements the functions, processes, and/or methods proposed in the present invention. For example, the processor 1710 may be implemented to perform the operations according to the above-described exemplary embodiments of the present invention. More specifically, among the operations that are disclosed in the exemplary embodiments of FIG. 1 to FIG. 16, the processor 1710 may perform the operations that may be performed by the AP.

The non-AP STA 1750 includes a processor 1760, a memory 1770, and a radio frequency (RF) unit 1780.

The RF unit 1780 is connected to the processor 1760, thereby being capable of transmitting and/or receiving radio signals.

The processor 1760 implements the functions, processes, and/or methods proposed in the present invention. For example, the processor 1760 may be implemented to perform the operations of the non-AP STA according to the above-described exemplary embodiments of the present invention. The processor may perform the operations of the non-AP STA, which are disclosed in the exemplary embodiments of FIG. 1 to FIG. 16.

The processor 1710 and 1760 may include an application-specific integrated circuit (ASIC), another chip set, a logical circuit, a data processing device, and/or a converter converting a baseband signal and a radio signal to and from one another. The memory 1720 and 1770 may include a read-only memory (ROM), a random access memory (RAM), a flash memory, a memory card, a storage medium, and/or another storage device. The RF unit 1730 and 1780 may include one or more antennas transmitting and/or receiving radio signals.

When the exemplary embodiment is implemented as software, the above-described method may be implemented as a module (process, function, and so on) performing the above-described functions. The module may be stored in the memory 1720 and 1770 and may be executed by the processor 1710 and 1760. The memory 1720 and 1770 may be located inside or outside of the processor 1710 and 1760 and may be connected to the processor 1610 and 1660 through a diversity of well-known means.

According to an embodiment of the present specification, there is provided a method for transmitting an uplink frame in a wireless local area network (WLAN) system having improved capability, and a wireless terminal using the method.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for a communication device operating as a receiving station (STA) that is not associated with an access point (AP) in a wireless local area network (WLAN) system, the method comprising:
    receiving, from the AP, a trigger frame including first association identifier (AID) information for orthogonal frequency division multiple access (OFDMA)-based random access and first resource allocation information for a first resource unit related to the first AID information,
    wherein the trigger frame further includes second AID information for the OFDMA-based random access and second resource allocation information for a second resource unit related to the second AID information,
    wherein the first AID information is set as a first value for one or more STAs that are associated with the AP or a second value for one or more STAs that are not associated with the AP, and
    wherein the second association information is set as the first value or the second value; and
    performing, by the receiving STA, a countdown operation by decrementing a backoff counter for the OFDMA-based random access by '2' according to the first resource unit and the second resource unit when the first AID information and the second AID information are set as the second value;
    determining, by the receiving STA, any one of the first resource unit or the second resource unit as a random resource unit when the backoff counter becomes '0' according to the countdown operation; and
    transmitting, by the receiving STA, an uplink frame to the AP based on the random resource unit.

2. The method of claim 1,
    wherein the first AID information is set based on 12 bits,
    wherein the first value is set to '1', and
    wherein the second value is set to '2'.

3. The method of claim 1, wherein a size of the first resource unit related to the first AID information set to the second value is larger than a size of the second resource unit related to the second AID information set to the first value.

4. The method of claim 1, wherein the uplink frame includes an association request frame.

5. A wireless terminal operating as a receiving station (STA) that is not associated with an access point (AP) in a wireless local area network (WLAN), the wireless terminal comprising:
    a transceiver for transmitting and receiving a radio signal; and
    a processor operatively coupled to the transceiver, wherein the processor is configured for:
        receiving, from the AP, a trigger frame including first association identifier (AID) information for orthogonal frequency division multiple access (OFDMA)-based random access and first resource allocation information for a first resource unit related to the first AID information,
        wherein the trigger frame further includes second AID information for the OFDMA-based random access and second resource allocation information for a second resource unit related to the second AID information,
        wherein the first AID information is set as a first value for one or more STAs that are associated with the AP or a second value for one or more STAs that are not associated with the AP, and
        wherein the second association information is set as the first value or the second value; and
        performing a countdown operation by decrementing a backoff counter for the OFDMA-based random access by '2' according to the first resource unit and the second resource unit when the first AID information and the second AID information are set as the second value;
        determining any one of the first resource unit or the second resource unit as a random resource unit when the backoff counter becomes '0' according to the countdown operation; and
        transmitting an uplink frame to the AP based on the random resource unit.

6. The wireless terminal of claim 5,
    wherein the first AID information is set based on 12 bits,
    wherein the first value is set to '1', and
    wherein the second value is set to '2'.

7. The wireless terminal of claim 5, wherein a size of the first resource unit related to the first AID information set to the second value is larger than a size of the second resource unit related to the second AID information set to the first value.

8. The wireless terminal of claim 5, wherein the uplink frame includes an association request frame.

* * * * *